US010040461B2

(12) United States Patent
Timan et al.

(10) Patent No.: US 10,040,461 B2
(45) Date of Patent: Aug. 7, 2018

(54) MONORAIL VEHICLE WITH SHAPED INTERIOR SHELL

(71) Applicant: Bombardier Transportation GmbH, Berlin (DE)

(72) Inventors: Peter Edward Timan, Sydenham (CA); Hans Peter Trotsch, Pittsburgh, PA (US); Martin Bazant, Maennedorf (CH); Daniel Martinez-Anon-Perez, Bilbao (ES); Alexander Bauer, Pittsburgh, PA (US)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 15/712,283

(22) Filed: Sep. 22, 2017

(65) Prior Publication Data
US 2018/0072185 A1 Mar. 15, 2018

Related U.S. Application Data

(63) Continuation of application No. 14/420,144, filed as application No. PCT/US2012/049956 on Aug. 8, 2012.

(51) Int. Cl.
*B61B 13/06* (2006.01)
*H02K 7/00* (2006.01)
(Continued)

(52) U.S. Cl.
CPC ............ *B61B 13/06* (2013.01); *B60L 3/0061* (2013.01); *B60L 7/14* (2013.01); *B60L 7/26* (2013.01);
(Continued)

(58) Field of Classification Search
CPC ...... B60K 1/00; B60K 7/0007; B60K 17/046; B60L 2220/44; B60L 2220/46; B61C 9/48; B61C 9/50; B61B 13/04; B61B 13/06
(Continued)

(56) References Cited

U.S. PATENT DOCUMENTS 1,592,269 A * 7/1926 Horine ................... B62D 31/02
180/210
1,736,695 A * 11/1929 Brooks ..................... B61C 9/24
105/133
(Continued)

FOREIGN PATENT DOCUMENTS

EP 1137566 A1 10/2001
GB 1004952 9/1965
(Continued)

OTHER PUBLICATIONS

Gartner, "City growth requires smarter solutions", Metro Report International, Jun. 2011, pp. 38-39.
(Continued)

*Primary Examiner* — Zachary L Kuhfuss
(74) *Attorney, Agent, or Firm* — The Webb Law Firm

(57) ABSTRACT

A monorail vehicle includes a chassis supporting a vehicle body, that includes a passenger floor and at least one side wall, and an electrical motor supported by the chassis. A drive wheel is coupled to a rotor of the electric motor with a rotation axis of the drive wheel substantially coaxial with an axis of the rotor. Portions of the drive wheel and the electric motor are positioned on both sides of an imaginary plane extension of the passenger floor. The drive wheel and the electric motor are covered by a shell that is integral to one side of the vehicle body and which defines a space between the other side of the vehicle body.

12 Claims, 4 Drawing Sheets

(51) Int. Cl.
    *B60L 15/20*     (2006.01)
    *B60L 9/28*     (2006.01)
    *B60L 7/26*     (2006.01)
    *B60L 7/14*     (2006.01)
    *B60L 3/00*     (2006.01)
    *B61C 9/50*     (2006.01)
    *B61C 3/00*     (2006.01)
    *B60L 13/00*     (2006.01)
    *B61B 13/04*     (2006.01)
    *H02K 7/116*     (2006.01)

(52) U.S. Cl.
    CPC ............... *B60L 9/28* (2013.01); *B60L 13/006* (2013.01); *B60L 15/2054* (2013.01); *B61B 13/04* (2013.01); *B61C 3/00* (2013.01); *B61C 9/50* (2013.01); *H02K 7/006* (2013.01); *H02K 7/116* (2013.01); *B60L 13/00* (2013.01); *B60L 2200/26* (2013.01); *B60L 2210/20* (2013.01); *B60L 2220/46* (2013.01); *B60L 2220/50* (2013.01); *B60L 2240/36* (2013.01); *Y02T 10/641* (2013.01); *Y02T 10/645* (2013.01); *Y02T 10/725* (2013.01); *Y02T 10/7275* (2013.01)

(58) Field of Classification Search
    USPC ........................ D12/37, 42, 43; 105/141, 145
    See application file for complete search history.

(56) References Cited

U.S. PATENT DOCUMENTS

| | | | | |
|---|---|---|---|---|
| 3,029,102 | A | * | 4/1962 | Mueller .................. B62D 31/04 105/340 |
| 3,143,977 | A | | 8/1964 | Deller |
| 3,216,371 | A | | 11/1965 | Holmquist et al. |
| 3,770,074 | A | | 11/1973 | Sherman |
| 3,971,455 | A | * | 7/1976 | Molzon .................. B62D 31/04 180/89.1 |
| 3,985,081 | A | | 10/1976 | Sullivan, II |
| 4,114,712 | A | * | 9/1978 | Finta ....................... B62D 31/02 180/21 |
| 4,799,564 | A | | 1/1989 | Iijima et al. |
| 4,996,928 | A | | 3/1991 | Janssen et al. |
| 5,934,198 | A | * | 8/1999 | Fraser ....................... B61B 5/02 104/119 |
| 6,328,123 | B1 | | 12/2001 | Niemann et al. |
| 6,749,532 | B2 | | 6/2004 | Wachauer |
| D680,904 | S | * | 4/2013 | Timan ........................... D12/42 |
| D680,905 | S | * | 4/2013 | Timan ........................... D12/42 |
| 2004/0144283 | A1 | | 7/2004 | Brunet |
| 2005/0245341 | A1 | | 11/2005 | Mueller et al. |
| 2006/0158024 | A1 | | 7/2006 | Wendl |
| 2007/0062774 | A1 | | 3/2007 | Akagi et al. |
| 2009/0266268 | A1 | | 10/2009 | Timan et al. |
| 2009/0273249 | A1 | | 11/2009 | Lamperth et al. |
| 2009/0293758 | A1 | | 12/2009 | Timan |
| 2011/0130238 | A1 | | 6/2011 | Schoon |
| 2011/0303117 | A1 | | 12/2011 | Timan et al. |

FOREIGN PATENT DOCUMENTS

| | | |
|---|---|---|
| GB | 2209318 A | 5/1989 |
| JP | 2000309269 A | 11/2000 |
| JP | 2003120765 A | 4/2003 |
| WO | 9727095 A1 | 7/1997 |
| WO | 0027681 A1 | 5/2000 |
| WO | 02062612 A1 | 8/2002 |
| WO | 2008132355 A2 | 11/2008 |
| WO | 2012009085 A2 | 1/2012 |

OTHER PUBLICATIONS

Um pouco das apresentacoes o monotrilho da L2 da 17a semana da AEAMESP: INNOVIA 300 (from a webpage), Sep. 24, 2011, http://www.skyscrapercity.com/showpost.php?=477eabaa471d5981578c51d2c7ea35dd&p=84103262&postcount=3957.

\* cited by examiner

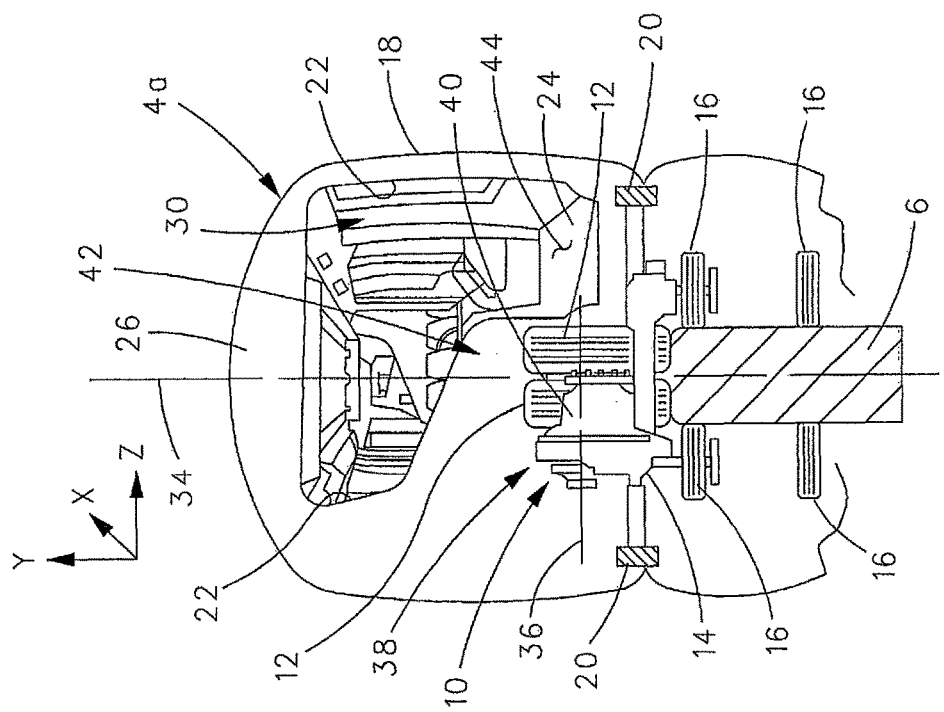
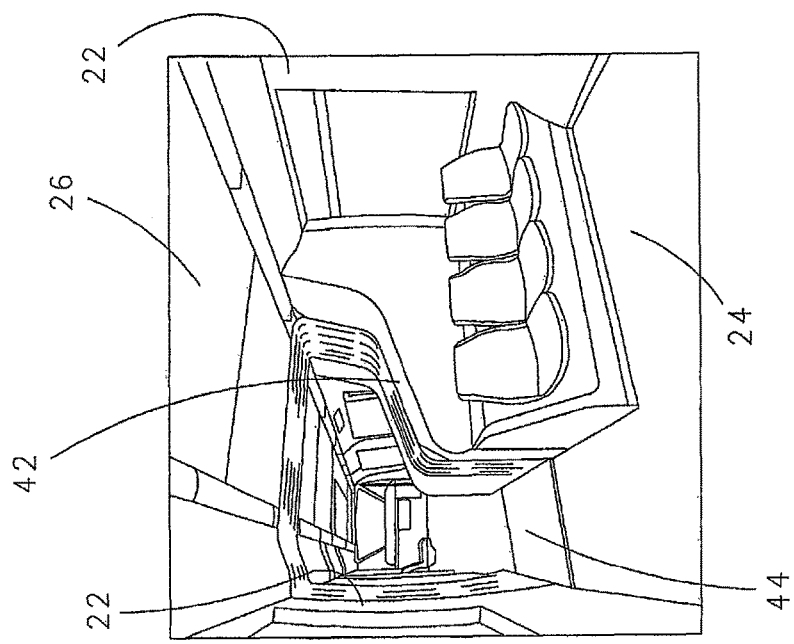

MONORAIL VEHICLE WITH SHAPED INTERIOR SHELL

CROSS-REFERENCE TO RELATED APPLICATIONS

This application is a Continuation of U.S. Ser. No. 14/420,144, which is the national phase of International Application no. PCT/US2012/049956, filed Aug. 8, 2012, titled INTEGRATED MOTOR-GEAR BOX WHEEL HUB DRIVE, the contents of both of which are incorporated herein by reference.

BACKGROUND OF THE INVENTION

Field of the Invention

This application relates generally to a monorail train including monorail vehicles and, more particularly, to drive units (or propulsion units) utilized to propel said monorail train or vehicle along a rail.

Description of Related Art

Prior art monorail trains, including monorail vehicles, include drive units or propulsion systems wherein the drive wheels and the drive motors were operatively coupled together, by a suitable gearing arrangement, with their respective rotation axes transverse or perpendicular to each other. Problems with such prior art arrangements include reduced passenger space in the interior of such vehicles and/or an increase in the overall height of the monorail vehicle to accommodate the drive unit or propulsion system.

SUMMARY OF THE INVENTION

Disclosed is a monorail vehicle comprising: a chassis coupled to a body of the monorail vehicle; a drive unit coupled to the chassis, the drive unit comprising an electric motor and a planetary gear assembly rotatably coupled to the electric motor, the planetary gear assembly comprising at least 3 planet gears coupled between a sun gear, which is coupled to a rotor of the electric motor, and a ring gear surrounding the planet gears, the planet gears rotatable within the ring gear (or the planet gears fixed and the ring gear rotatable) in response to rotation of the sun gear by the electric motor; and a rim assembly coupled to the planetary gear assembly for rotation thereby, the rim assembly including a pair of side-by-side rim sections adapted to support a pair of wheels side-by-side for rotation about a rotation axis of the rim assembly that runs coaxial with a rotation axis of the rotor of the electric motor and a rotation axis of the sun gear, the rim assembly further including a hub that extends radially from the rotation axis of the rim assembly and terminates on an interior surface of the rim assembly, wherein one of the rim sections at least partially surrounds and rotates about the planetary gear assembly in response to rotation of the rim assembly by the planetary gear assembly.

The electric motor can be AC motor. The AC motor can be a permanent magnet AC motor. The permanent magnets can be disposed on the rotor.

The hub can terminate on the interior surface of the rim assembly between the pair of side-by-side rim sections.

The planetary gear assembly and the electric motor can be received within a housing that is coupled to the chassis, wherein the one rim section rotates about a section of the housing that houses the planetary gear assembly.

A brake rotor can be coupled to an end of the rotor of the electric motor opposite the sun gear.

An interior of the vehicle can define a passenger pathway that extends longitudinally along one side of the vehicle between an interior surface of the vehicle body and the drive unit.

The electric motor can be disposed within a housing that is coupled to the chassis. The housing can include fluid channels for allowing the passage of a cooling liquid therethrough for removal of heat generated by the electric motor.

Also disclosed is a monorail vehicle comprising: a chassis supporting an elongated vehicle body that includes spaced sides and a passenger floor, wherein a length direction, a height direction and a width (or side-to-side) direction of the elongated vehicle body correspond to X, Y and Z axes, respectively, of a Cartesian coordinate system, wherein the X and Y axes define an imaginary plane that bisects the vehicle body in half; a drive unit coupled to the chassis, the drive unit comprising an electric motor and a gear assembly, the electric motor including a rotor that has an axis that is disposed substantially parallel with the Z axis; and at least one drive wheel coupled to the rotor via the gear assembly, each drive wheel having a rotation axis that is disposed substantially coaxial with the rotor axis, wherein the drive unit is supported by the chassis with the electric motor and at least part of the gear assembly residing entirely in one of the halves of the vehicle body with at least portions of each drive wheel, the electric motor and the gear assembly residing above a plane of the passenger floor of the vehicle body.

A portion of the passenger floor can be disposed between one side of the vehicle body and the portions of each wheel, the electric motor and the gear assembly.

The electric motor can be a permanent magnet AC electric motor. The electric motor can be liquid cooled.

The gear assembly can be a planetary gear assembly. The planetary gear assembly can have at least 3 planet gears coupled between a sun gear and a ring gear which surrounds the planet gears, wherein the sun gear is coupled between the rotor and the planet gears such that the planet gears are rotatable within the ring gear (or the planets can be fixed and the ring gear can rotate) in response to rotation of the sun gear by the rotor.

The vehicle can include a pair of drive wheels supported by a rim assembly which is coupled to the gear assembly by a hub of the rim assembly, wherein at least part of the rim assembly surrounds the gear assembly, which part of the rim assembly is rotatable about the gear assembly in response to rotation of the rim assembly by the motor via the gear assembly.

The pair of drive wheels can have a common rotation axis. The rim assembly can include an individual rim or a pair of rim sections with each rim section supporting one of the drive wheels. The rim assembly can include the hub which extends radially from the common rotation axis and which terminates substantially at the intersection of the pair of rim sections.

The vehicle can include a bogie coupling the drive unit and each drive wheel to the chassis.

Also disclosed is a monorail vehicle comprising: a chassis supporting a vehicle body that includes a passenger floor and at least one side wall; an electrical motor supported by the chassis; and a drive wheel coupled to a rotor of the electric motor with a rotation axis of the drive wheel substantially coaxial with an axis of the rotor, wherein portions of the drive wheel and the electric motor are positioned on both sides of an imaginary plane extension of the passenger floor.

A gear assembly can be coupled substantially coaxially between the rotor and the drive wheel.

The gear assembly can be a planetary gear assembly that has a rotational axis coaxial with the axis of the rotor and the rotation axis of the drive wheel. Portions of the gear assembly can be positioned on both sides of the imaginary plane extension of the passenger floor.

The passenger floor can run or extend between a front and a rear of the vehicle body and in a space between the drive wheel and the side wall.

A bogie can couple the electrical motor and the drive wheel to the chassis.

BRIEF DESCRIPTION OF THE DRAWINGS

FIG. 2 is a section taken along lines II-II in FIG. 1 showing the bogie, the drive unit, and a section of the drive wheels relative to the drive unit, in relation to an interior of the monorail vehicle and showing a space on the passenger floor between the drive wheels and a side of the monorail vehicle;

FIG. 3 is a perspective view of the interior of the monorail vehicle taken along lines in FIG. 1 showing a space on the passenger floor between a shell, covering a bogie, a drive unit, and drive wheels, and an interior side of the monorail vehicle;

DETAILED DESCRIPTION OF THE INVENTION

The present invention will be described with reference to the accompanying figures where like reference numbers correspond to like elements.

A monorail train 2 comprises one or more monorail vehicles 4 which travel along a single rail 6, which acts as its sole support and its guideway. This single rail 6 is also known as beam or track or guideway.

Figure 1:
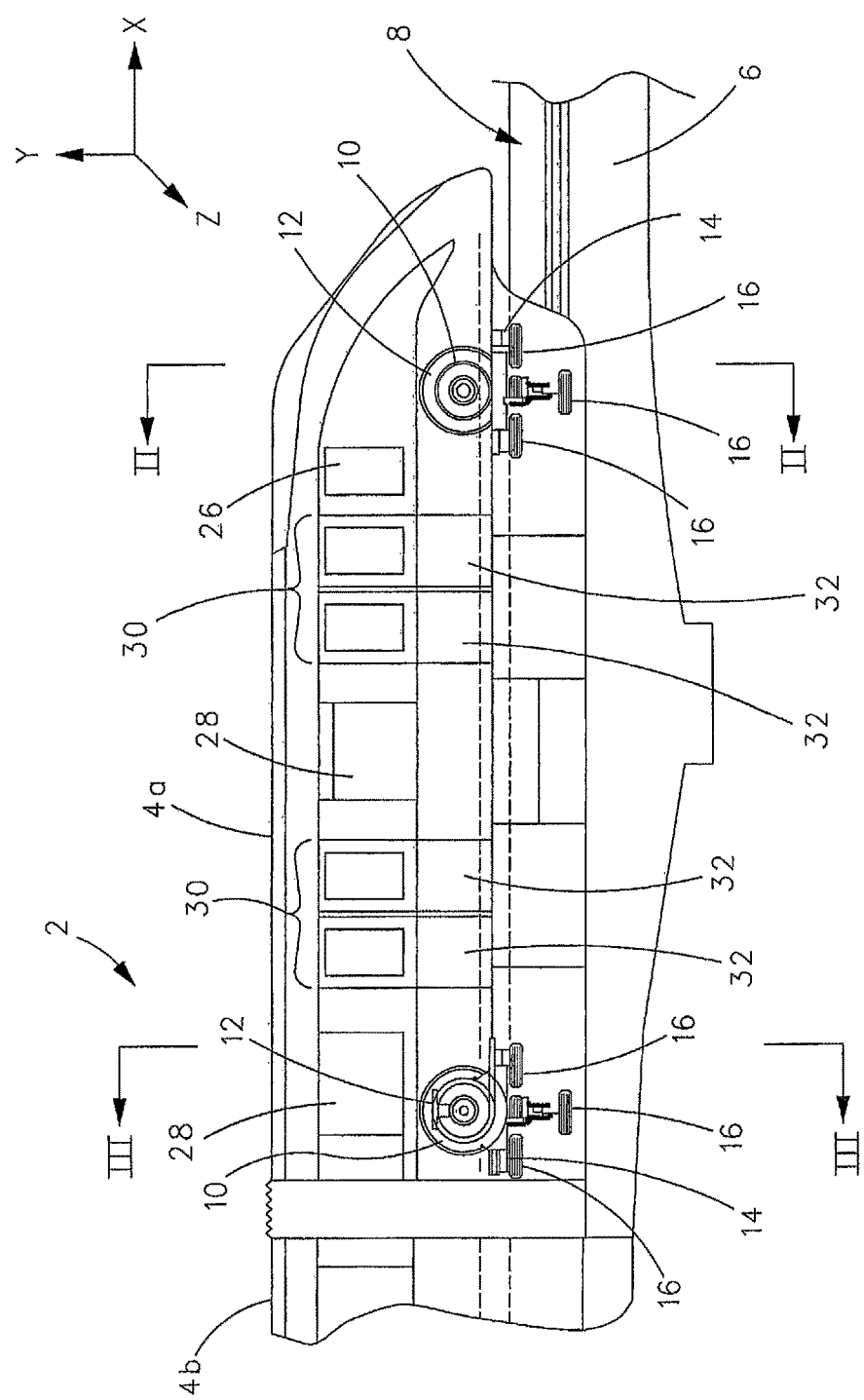
FIG. 1 is a view of a monorail train including a first car and a partial second car, wherein the first car includes a phantom view of a pair of bogies, with each bogie supporting a drive unit and drive wheels of the monorail vehicle.

FIG. 1 shows the side view of a lead monorail vehicle 4a and a partial view of a following monorail vehicle 4b which is coupled to monorail vehicle 4a in a manner known in the art to form monorail train 2. Other monorail vehicles may be coupled in series to the end of vehicle 4b opposite vehicle 4a to form a monorail train of any suitable and/or desirable length. Each vehicle 4 of train 2 receives electrical power via dual third rails, contact wires or electrified channels 8 attached to or enclosed in single rail 6.

With reference to FIG. 2 and with continuing reference to FIG. 1, each monorail vehicle 4 includes one or more drive units 10. Each drive unit 10 is coupled to one or more drive wheels 12 which roll along a top part of single rail 6. Each drive unit 10 is coupled to a bogie 14 which supports drive unit 10 and drive wheels 12 in the manner discussed above, and which also supports guide wheels 16 on opposite sides of single rail 6. The number and physical arrangement of guide wheel 16 on opposite sides of single rail 6 can be selected in any suitable or desirable manner by one of ordinary skill in the art. For example, in the embodiment shown in FIG. 1, each bogie 14 supports three guide wheels on either side of single rail 6 in a T-arrangement, with two guide wheels at the top of the T and a single guide wheel at the bottom of the T. The number and arrangement of guide wheels shown in FIG. 1, however, is not to be construed as limiting the invention in any manner.

With reference to FIG. 3 and with continuing reference to FIGS. 1 and 2, each monorail vehicle 4 has a body 18 which is supported by a frame 20 to which each bogie 14 of vehicle 4 is coupled. Vehicle body 18 includes spaced sides 22, a passenger floor 24, and a roof 26. Each side 22 can optionally include one or more windows 28 and one or more passenger doors 30 that facilitate ingress and egress of passengers between the inside and outside of body 18. In one non-limiting embodiment, each door 30 comprises one or more panels 32 which move in a first manner to reveal the opening between the interior and exterior of body 18 and which move in an opposite manner to close off the opening. In one non-limiting embodiment, each panel 32 can be a so-called pocket door which can slide between two wall panels of a side 22 to form the passenger door opening and which can slide from between the two wall panels to close off the passenger opening.

For the purpose of description, the length, height, and width (or side-to-side) direction or elongated vehicle body 18 can be considered to correspond to X, Y and Z axes respectively of a Cartesian coordinate system. The X and Y axes define an imaginary plane that divides vehicle body in half along the X direction. More desirably, the X and Y axes define an imaginary plane 34 that bisects the vehicle body 18 in half. The X and Z axes can be thought of as defining an imaginary plane 36 extension (shown in phantom in FIG. 2) of passenger floor 24.

Drive unit 10 includes an AC electric motor 38 and a gear assembly 40 that is coupled to each drive wheel 12. As shown in FIG. 2, electric motor 38 is disposed in one of the halves of vehicle body 18 defined by imaginary plane 34. In addition, all or substantially all of gear assembly 40 is disposed in the same side of vehicle body 18 as AC electric motor 38. In addition, at least portions of each drive wheel 12, AC electric motor 38, and gear assembly 40 reside above imaginary plane extension 36 of passenger floor 24.

As shown in FIGS. 2 and 3, because drive unit 10 can be placed all or substantially all in one of the halves (one side) of the vehicle defined by imaginary plane 34, wheels 12, and drive unit 10 can be covered by a shell 42 that is integral with one side 22 of vehicle body 18 (the left side 22 in FIG. 2) but which defines a space 44 between the other side 22 of vehicle body 18 (the right side 22 in FIG. 2) and the portions of each drive wheel 12, electric motor 38, and gear unit 40 residing above imaginary plane extension 36 of passenger floor 24. Stated differently, because of the arrangement of drive unit 10, bogie 14, and wheels 12, a portion of passenger floor 24 can be disposed between one side 22 of vehicle body 18 (the right side in FIG. 2) and the portions of each wheel 12, electric motor 38, and gear assembly 40 that reside above the imaginary plane extension 36 of passenger floor 24.

Figure 4:
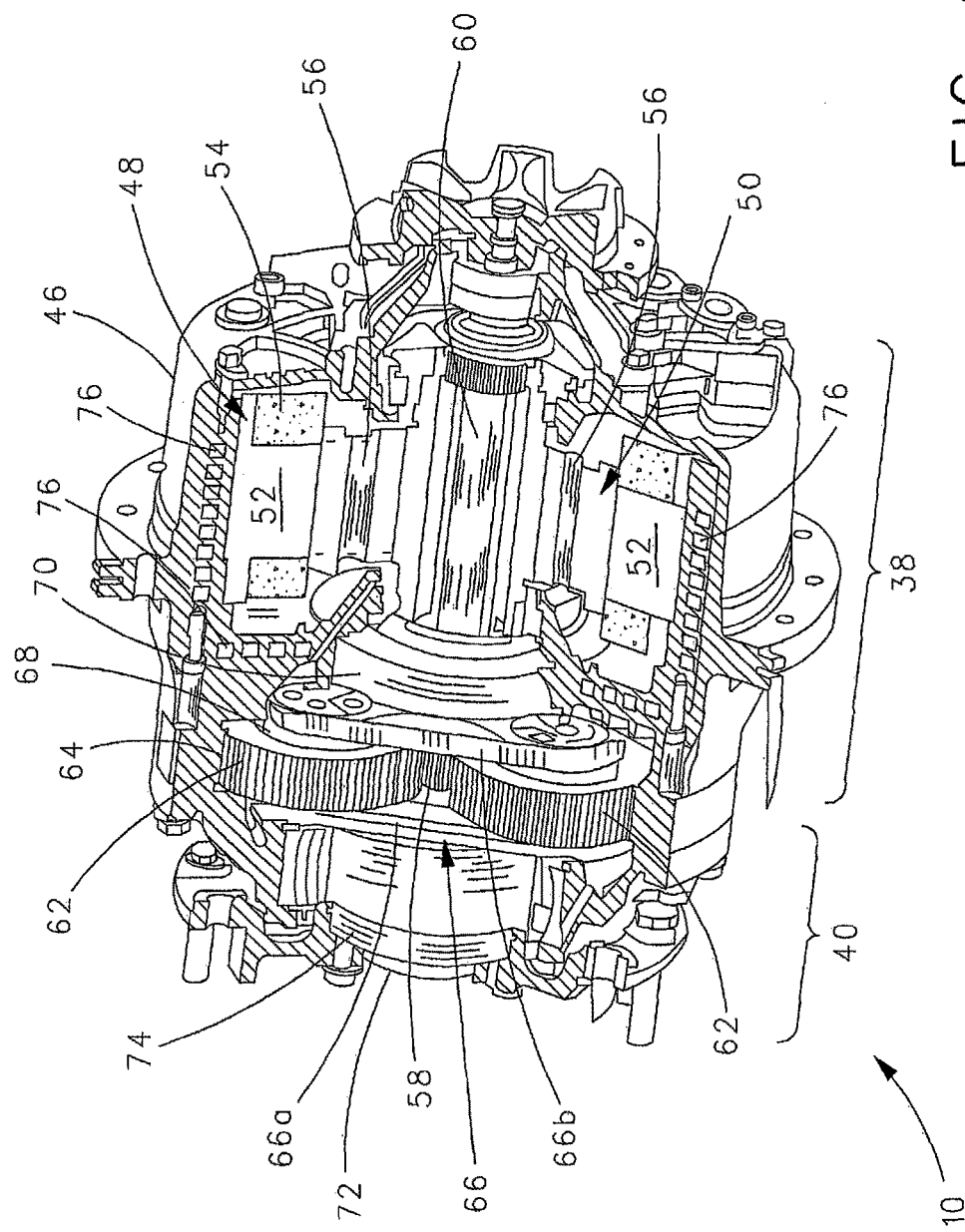
FIG. 4 is a partially cutaway view of one of the drive units shown in phantom view in FIG. 1.

With reference to FIG. 4, as discussed above, drive unit 10 includes AC electric motor 38 and gear assembly 40 received within a housing 46. AC electric motor 38 includes a stator 48 and a permanent magnet rotor assembly 50. Stator 48 includes a magnetically susceptible core 52 and windings 54 disposed on core 52 in a manner known in the art. Windings 54 can be connected to a power convertor (not shown) disposed on monorail vehicle 4 for controlling the supply of AC electrical power to AC electrical motor 38 in a manner known in the art to cause rotation of permanent magnet rotor assembly 50 in an appropriate rotationally direction (clockwise and/or counterclockwise).

Permanent magnet rotor 50 includes one or more permanent magnets 56, desirably in place of rotor windings, to facilitate AC electric motor 38 being lighter and smaller than a conventional AC motor while providing a higher power output. In one non-limiting embodiment, AC electric motor is a 160 kw motor. However, this is not to be construed as limiting the invention. Moreover, the description herein of AC electric motor 38 having a permanent magnet rotor 50 is not to be construed in any manner as limiting the invention.

To maintain the compactness of drive unit 10, gear assembly 40 is preferably a planetary gear assembly that includes a sun gear 58, coupled to one end of a drive shaft 60 of rotor assembly 50. The planetary gear assembly forming gear assembly 40 includes three or more planet gears 62 that surround and mesh with sun gear 58. A ring gear 64 surrounds and meshes with planet gears 62. To facilitate rotation of planet gears 62 around sun gear 58 in response to rotation of sun gear 58 by drive shaft 60 (in addition to rotation of each planet gear around its own rotation axis), planet gears 62 are held in fixed relation to each other by a planet carrier assembly 66 comprised of a first part 66a and a second part 66b on opposite sides of planet gears 62. Each planet gear 62 is coupled to planet carrier assembly 66 via a planet bearing ring 68 that enables the corresponding planet gear 62 to rotate about its rotational axis during rotation of the entire planet carrier assembly 66 by sun gear 58.

A planet carrier bearing ring 70 supports planet carrier assembly 66 for rotation about sun gear 58 in response to rotation thereof. Desirably, a rotational axis 86 of drive shaft 60 of AC electric motor 38, a rotational axis 88 of sun gear 58 and a rotational axis of planet carrier assembly 66 are coaxial.

Planet carrier assembly 66 also includes a hub connection housing 72 coupled to first part 66a of planet carrier assembly 66 for rotation with planet carrier assembly 66 in response to rotation of sun gear 58 by AC electric motor 38. A portion 74 of stationary housing 46 surrounds rotatable hub connection housing 72 of planet carrier assembly 66. A bearing ring (not shown) is disposed between portion 74 of stationary housing 46 and rotatable hub connection housing 72 to support the rotation thereof in operation.

AC electric motor 38 includes cooling channels 76 disposed in one or more stationary portions of AC electric motor 38. Each cooling channel 76 is adapted to facilitate the flow of a cooling liquid therethrough whereupon AC electric motor 38 can be liquid cooled.

Figure 5:
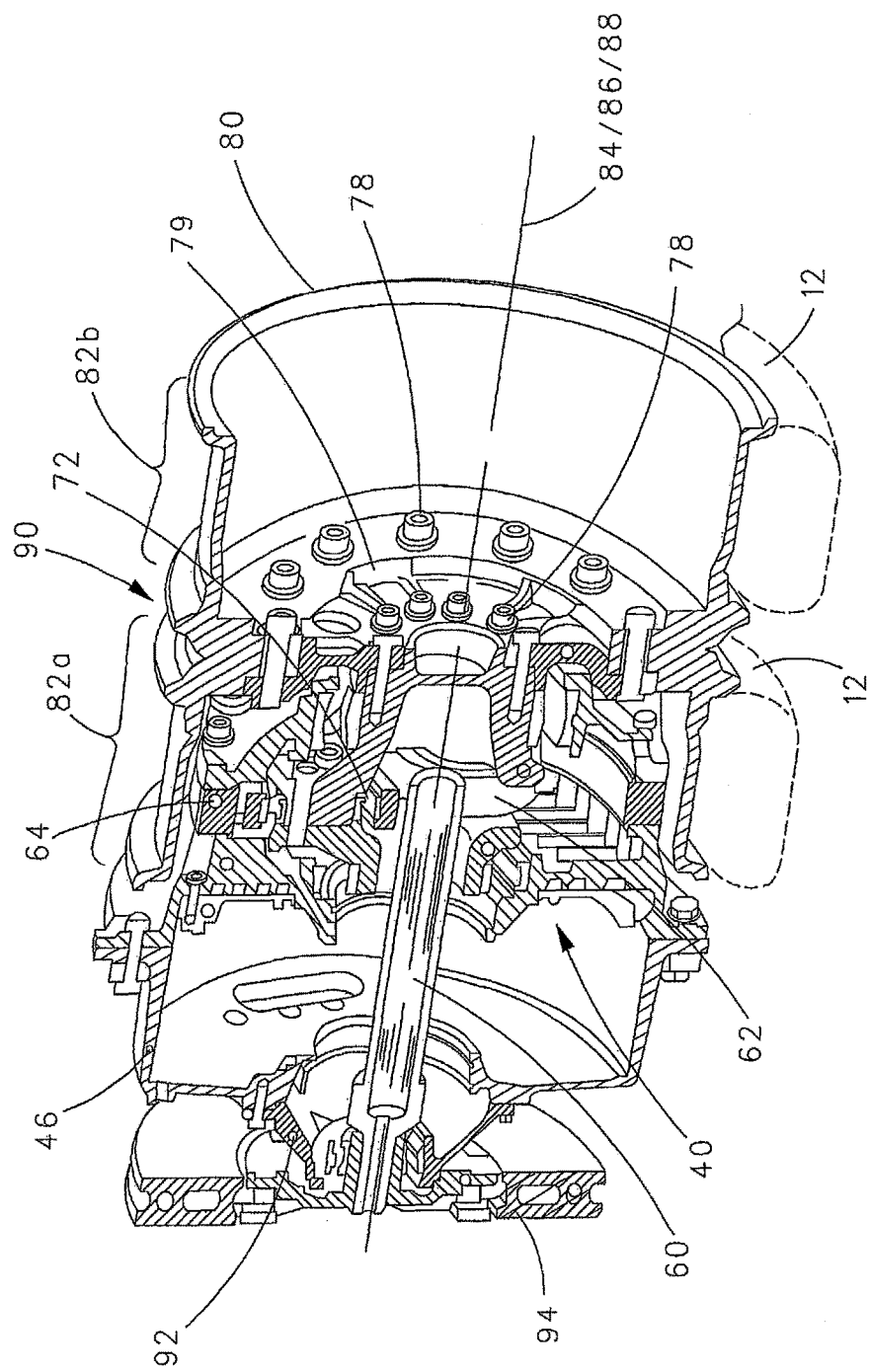
FIG. 5 is an isolated perspective view of some of the internal components of the drive unit shown in FIG. 4 including a rim assembly coupled via a gear assembly to one end of a rotor of an electric motor of the drive unit and with a brake rotor coupled to the other end of the rotor.

With reference to FIG. 5 and with continuing reference to FIG. 4, as shown in FIG. 5, hub connection housing 72 of planet carrier assembly 66 is coupled via bolts 78 to a hub 79 (or wheel flange) of a rim assembly 80 that is coupled to the planet carrier gear assembly comprising gear assembly 40 for rotation thereby. Rim assembly 80 includes a pair of side-by-side rim sections 82a and 82b adapted to support a pair of drive wheels 12 side-by-side for rotation about a rotation axis 84 of rim assembly 80 that is disposed or runs coaxial with a rotation axis 86 of rotor 60 and a rotation axis 88 of sun gear 58. As can be seen in FIG. 5, rotation axes 84, 86, and 88 are coaxial (or substantially coaxial). As can also be seen in FIG. 5, hub 79 extends radially from rotation axis 84 of rim assembly 80 and terminates on an interior surface of rim assembly 80. Desirably, hub 79 extends radially from rotation axis 84 of rim assembly 80 and terminates substantially at the intersection 90 of rim sections 82a and 82b. In FIG. 5, each rim section 82a and 82b includes a portion of a drive wheel 12 (shown in phantom) on the bottom of said rim section to facilitate an understanding of the invention.

Because of the connection of hub 79 to hub connection housing 72 which is coupled to the planetary gear assembly comprising gear assembly 40, drive shaft 60 rotating sun gear 58, planet gears 62 and hub connection housing 72 also rotates hub 79 and rim sections 82a and 82b about a rotation axis 84 of rim assembly 80.

As can be seen in FIG. 5, rim section 82a at least partially surrounds and will rotate about the planetary gear assembly that comprises gear assembly 40 in response to rotation of rim assembly 80 via gear assembly 40.

With continuing reference to FIG. 5, a brake flange is coupled to an end of drive shaft 60 opposite gear assembly 40. In FIG. 5, sun gear 58 has been omitted from rotor 60 for simplicity. A brake rotor 94 is coupled to brake flange 92. Brake rotor 94 can be utilized in combination with brake pads (not shown) coupled to bogie 14 in a manner known in the art for braking drive wheels 12.

As can be seen, disclosed is a compact drive unit 10 which can be coupled to a rim assembly, with a rotation axis of AC electric motor 38 coaxial with a rotation axis of rim assembly 80. A gear assembly 40, desirably a planetary gear assembly, can be coupled between AC electric motor 38 and rim assembly 80 with the rotation axis of the gear assembly 40 coaxial with the rotation axes of AC electric motor 38 and rim assembly 80. The combination of the disclosed drive unit and the disclosed rim assembly provides a compact arrangement for driving drive wheel 12 along rail 6. More specifically, the coaxial (or substantially coaxial) arrangement of the rotation axes 84, 86 and 88 of rim assembly 80, drive shaft 60, and sun gear 58/planetary gear assembly avoids having to use a space consuming angled gear assembly arrangement to couple an electric motor to a rim assembly with their respective rotation axes disposed transverse or perpendicular to each other.

The present invention has been described with reference to the accompanying figures. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A monorail vehicle comprising:
    a chassis supporting an elongated vehicle body that includes spaced sides and a passenger floor, wherein a length direction, a height direction and a width (or side-to-side) direction of the elongated vehicle body correspond to X, Y and Z axes, respectively, of a Cartesian coordinate system, wherein the X and Y axes define a vertical imaginary plane that bisects the vehicle body in half;
    a drive unit coupled to the chassis, the drive unit comprising an electric motor and a gear assembly, the electric motor including a rotor that has an axis that is disposed substantially parallel with the Z axis; and
    at least one drive wheel coupled to the rotor via the gear assembly, each drive wheel having a rotation axis that is disposed substantially coaxial with the rotor axis, wherein the drive unit is supported by the chassis with the electric motor and at least part of the gear assembly residing in one of the halves of the vehicle body with at least portions of each drive wheel, the electric motor and the gear assembly residing above a plane of the passenger floor of the vehicle body, wherein:

the drive wheel and the drive unit are covered by a shell that is integral to one side of the vehicle body and which defines a space between the other side of the vehicle body, wherein the drive wheel and the drive unit are also positioned on both sides of a horizontal imaginary plane extension of the passenger floor, wherein the horizontal imaginary plane is defined by the X and Z axes, the shell has a surface that extends from the passenger floor to a roof of the vehicle body, proximate the space, a first part of the shell surface rises from the passenger floor to a first elevation above the passenger floor, proximate the one side of the vehicle body a second part of the shell surface depends from a roof of the vehicle body to a second elevation above the passenger floor or the horizontal imaginary plane extension of the passenger floor, and the shell surface includes a third part that connects the first and second parts of the shell surface.

2. The vehicle of claim 1, wherein from the first part of the shell surface to the second part of the shell surface, the third part of the shell surface increases in elevation above the passenger floor or the horizontal imaginary plane extension of the passenger floor.

3. The vehicle of claim 1, wherein a portion of the passenger floor is disposed between one side of the vehicle body and the at least one drive wheel and the drive unit.

4. The vehicle of claim 1, wherein the electric motor is a permanent magnet AC electric motor.

5. The vehicle of claim 1, wherein the electric motor is liquid cooled.

6. The vehicle of claim 1, wherein the gear assembly is a planetary gear assembly.

7. The vehicle of claim 6, wherein the planetary gear assembly has 3 planet gears coupled between a sun gear and a ring gear which surrounds the planet gears, wherein the sun gear is coupled between the rotor and the planet gears such that the planet gears are rotatable within the ring gear in response to rotation of the sun gear by the rotor.

8. The vehicle of claim 1, wherein the at least one drive wheel comprises a pair of drive wheels supported by a rim assembly which is coupled to the gear assembly by a hub of the rim assembly, wherein at least part of the rim assembly surrounds the gear assembly, which part of the rim assembly is rotatable about the gear assembly in response to rotation of the rim assembly by the motor via the gear assembly.

9. The vehicle of claim 8, wherein the vertical imaginary plane intersects the rim assembly.

10. The vehicle of claim 9, wherein the hub of the rim assembly lies on the vertical imaginary plane.

11. The vehicle of claim 8, wherein the pair of drive wheels have a common rotation axis, the rim assembly includes a pair of rim sections with each rim section supporting one of the drive wheels, and the rim assembly includes the hub which extends radially from the common rotation axis and which terminates substantially at the intersection of the pair of rim sections.

12. The vehicle of claim 1, wherein a bogie couples the drive unit and each drive wheel to the chassis.

* * * * *